(12) United States Patent
Chen

(10) Patent No.: US 12,205,401 B2
(45) Date of Patent: *Jan. 21, 2025

(54) READOUT INTEGRATED CIRCUIT

(71) Applicant: Novatek Microelectronics Corp., Hsinchu (TW)

(72) Inventor: Chi-Ting Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 44 days.

This patent is subject to a terminal disclaimer.

(21) Appl. No.: 17/985,895

(22) Filed: Nov. 13, 2022

(65) Prior Publication Data

US 2023/0070145 A1    Mar. 9, 2023

Related U.S. Application Data

(63) Continuation-in-part of application No. 17/168,185, filed on Feb. 5, 2021, now Pat. No. 11,503,241.

(Continued)

(51) Int. Cl.
*G06V 40/13* (2022.01)
(52) U.S. Cl.
CPC .................. *G06V 40/1318* (2022.01)
(58) Field of Classification Search
CPC ...... H10K 39/32; H10K 59/65; G06V 10/147; G06V 10/143; G06V 40/19; G06V 10/761;

(Continued)

(56) References Cited

U.S. PATENT DOCUMENTS 10,839,188 B2    11/2020    Lu et al.
11,178,350 B2    11/2021    Ueno et al.
(Continued)

FOREIGN PATENT DOCUMENTS

CN    102487436    6/2012
CN    108960176    12/2018
(Continued)

OTHER PUBLICATIONS

Zheng; Hao et al., "An Analog Front-end Readout Circuits for 4x4 Matrix Quadrant APD Sensor", Research &Progress of SSE, Jun. 2018, with English abstract, pp. 214-218, 229, vol. 38, No. 3.

(Continued)

*Primary Examiner* — Sanjiv D. Patel
(74) *Attorney, Agent, or Firm* — JCIPRNET

(57) ABSTRACT

A readout integrated circuit configured to read out sensing signals from an optical sensing panel is provided. The optical sensing panel includes a sensor array for fingerprint sensing. The readout integrated circuit includes a plurality of input terminals and a first discharging circuit. The plurality of input terminals are coupled to a plurality of output terminals of the optical sensing panel. The first discharging circuit is coupled to one of the plurality of input terminals. The first discharging circuit serves to discharge an output terminal included in the plurality of output terminals of the optical sensing panel by a first current during a readout period. The readout integrated circuit reads out a voltage of the output terminal as a sensing signal. The first discharging circuit includes a first switch element controlled by a control signal and a first current source which generates the first current.

28 Claims, 12 Drawing Sheets

Related U.S. Application Data

(60) Provisional application No. 62/970,713, filed on Feb. 6, 2020.

(58) Field of Classification Search
CPC .. G06V 40/13; G06V 40/1318; G06V 10/751; G06V 40/145; G06V 40/1341; G06F 3/0304; H01L 27/14612; H01L 27/14643; G09G 2320/0233; G09G 2320/0223; G09G 2320/0295; G09G 2320/043; G09G 2360/148; G09G 3/3208; G09G 3/3233
See application file for complete search history.

(56) References Cited

U.S. PATENT DOCUMENTS

| | | | |
|---|---|---|---|
| 11,503,241 | B2 | 11/2022 | Chen |
| 11,503,242 | B2 | 11/2022 | Chen |
| 2011/0198484 | A1* | 8/2011 | Kurokawa ............ G06F 3/0412 250/214 R |
| 2013/0327924 | A1* | 12/2013 | Machida ............... H04N 25/766 257/229 |
| 2019/0154473 | A1 | 5/2019 | Li et al. |
| 2019/0237008 | A1* | 8/2019 | Ho ...................... G09G 3/3208 |
| 2019/0311171 | A1 | 10/2019 | Lu et al. |
| 2020/0029040 | A1* | 1/2020 | Johnson ................ H04N 25/75 |
| 2020/0244907 | A1* | 7/2020 | Ueno ................... H04N 25/75 |
| 2021/0248342 | A1 | 8/2021 | Chen |
| 2021/0250537 | A1 | 8/2021 | Chen |
| 2021/0368119 | A1* | 11/2021 | Hirose ................. H04N 25/77 |

FOREIGN PATENT DOCUMENTS

| | | |
|---|---|---|
| CN | 215642733 | 1/2022 |
| EP | 3376754 | 9/2018 |
| JP | 2019030002 | 2/2019 |

OTHER PUBLICATIONS

Pranav Koundinya et al., "Multi Resolution Touch Panel with Built-in Fingerprint Sensing Support", 2014 Design, Automation & Test in Europe Conference & Exhibition (Date), Apr. 21, 2014, pp. 1-6.

"Office Action of China Counterpart Application", issued on Oct. 17, 2024, p. 1-p. 12.

* cited by examiner

READOUT INTEGRATED CIRCUIT

CROSS-REFERENCE TO RELATED APPLICATION

This application is a continuation-in-part application of and claims the priority benefit of a prior U.S. application Ser. No. 17/168,185, filed on Feb. 5, 2021, which claims the priority benefit of U.S. provisional application Ser. No. 62/970,713, filed on Feb. 6, 2020. The entirety of each of the above-mentioned patent applications is hereby incorporated by reference herein and made a part of this specification.

BACKGROUND

Technical Field

The disclosure relates to an electronic circuit, more specifically, to a readout integrated circuit.

Description of Related Art

An in-display fingerprint sensing panel equipped with optical sensors is fabricated on a lower substrate of a display panel. The optical sensors arranged as a sensor array are utilized for sensing lights reflected from a finger positioned on the fingerprint sensing panel to generate fingerprint sensing signals, and the fingerprint sensing signals are received by a fingerprint readout integrated circuit through sensing lines and output terminals of the fingerprint sensing panel. The fingerprint readout integrated circuit is configured to read out the fingerprint sensing signals and further transmit the fingerprint sensing signals that are converted to digital sensing data to a processing unit for fingerprint recognition. For example, regarding to a handheld device such as a mobile phone having a touch display screen with an in-display fingerprint sensing panel, the fingerprint readout integrated circuit in the mobile phone may transmit fingerprint sensing data to an application processor. The application processor then performs image processes on the fingerprint sensing data to generate a fingerprint image for fingerprint recognition.

However, when the size of the fingerprint sensing panel is large, transmission distances from optical sensors (called the fingerprint sensing pixels) at different positions to the output terminals of the fingerprint sensing panel may be different. Some of the optical sensors are located close to corresponding output terminals and transmit the fingerprint sensing signals through a shorter distance, whereas the other optical sensors are located far from corresponding output terminals and transmit the fingerprint sensing signals through a long distance. For the optical sensors which are far from the output terminals, the fingerprint sensing signals are transmitted through the sensing line which has a large load. It may lead to a negative impact for the fingerprint sensing signals. For example, a settling time of the fingerprint sensing signals may be too long, such that the quality of the fingerprint image generated according to the fingerprint sensing signals becomes poor.

SUMMARY

The disclosure is directed to a readout integrated circuit, in which the settling time of the fingerprint sensing signals is short to improve the quality of the fingerprint image.

An embodiment of the disclosure provides a readout integrated circuit configured to read out sensing signals from an optical sensing panel. The optical sensing panel includes a sensor array for fingerprint sensing. The readout integrated circuit includes a plurality of input terminals and a first discharging circuit. The plurality of input terminals are configured to be coupled to a plurality of output terminals of the optical sensing panel. The first discharging circuit is coupled to one of the plurality of input terminals. The first discharging circuit is configured to discharge an output terminal included in the plurality of output terminals of the optical sensing panel by a first current during a readout period. The readout integrated circuit reads out a voltage of the output terminal as a sensing signal. The first discharging circuit includes a first switch element and a first current source. The first switch element is controlled to be either conducted or not by a control signal. A first terminal of the first switch element is coupled to the output terminal of the optical sensing panel, and a control terminal of the first switch element is coupled to the control signal. The first current source is coupled to a second terminal of the first switch element, and the first current source is configured to generate the first current.

An embodiment of the disclosure provides a readout integrated circuit configured to read out sensing signals from an optical sensing panel. The optical sensing panel includes a sensor array for fingerprint sensing. The readout integrated circuit includes a plurality of input terminals and a first charging circuit. The plurality of input terminals are configured to be coupled to a plurality of output terminals of the optical sensing panel. The first charging circuit is coupled to one of the plurality of input terminals. The first charging circuit is configured to charge an output terminal included in the plurality of output terminals of the optical sensing panel by a first current during a readout period. The readout integrated circuit reads out a voltage of the output terminal as a sensing signal. The first discharging circuit includes a first switch element and a first current source. The first switch element is controlled to be either conducted or not by a control signal. A first terminal of the first switch element is coupled to the output terminal of the optical sensing panel, and a control terminal of the first switch element is coupled to the control signal. The first current source is coupled to a second terminal of the first switch element, and the first current source is configured to generate the first current.

An embodiment of the disclosure provides a readout integrated circuit configured to read out sensing signals from an optical sensing panel. The optical sensing panel includes a sensor array for fingerprint sensing. The readout integrated circuit includes a plurality of input terminals and a first charging/discharging circuit. The plurality of input terminals are configured to be coupled to a plurality of output terminals of the optical sensing panel. The first charging circuit is coupled to one of the plurality of input terminals. The first charging/discharging circuit is configured to charge or discharge an output terminal included in the plurality of output terminals of the optical sensing panel by a first current during a readout period. The readout integrated circuit reads out a voltage of the output terminal of the optical sensing panel as a sensing signal. The first charging/discharging circuit includes a first switch element and a second switch element. The first switch element is controlled by a first control signal, and the second switch element is controlled by a second control signal. A phase of the second control signal and a phase of the first control signal are inverted with each other.

An embodiment of the disclosure provides a readout integrated circuit configured to read out sensing signals from an optical sensing panel. The optical sensing panel includes a sensor array for fingerprint sensing. The readout integrated circuit includes a plurality of input terminals and a first charging/discharging circuit. The plurality of input terminals are configured to be coupled to a plurality of output terminals of the optical sensing panel. The first charging circuit is coupled to one of the plurality of input terminals. The first charging/discharging circuit is configured to charge or discharge an output terminal included in the plurality of output terminals of the optical sensing panel by a first current during a readout period. The readout integrated circuit reads out a voltage of the output terminal of the optical sensing panel as a sensing signal. The first charging/discharging circuit includes a first current source, a first switch element, and a diode element. The first switch element is controlled by a control signal. A first terminal of the first switch element is coupled to a first voltage, a second terminal of the first switch element is coupled to a control terminal of the first current source, and a control terminal of the first switch element is coupled to the control signal. The diode element includes an anode terminal and a cathode terminal. One terminal of the anode terminal and the cathode terminal is coupled to the output terminal of the optical sensing panel, and the other terminal of the anode terminal and the cathode terminal is coupled to a first terminal of the first current source.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
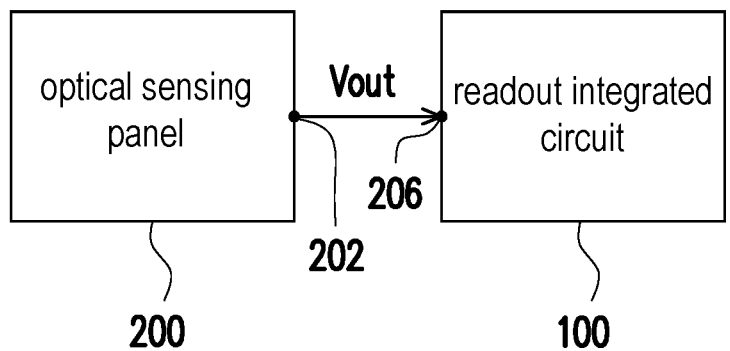
FIG. 1 is a schematic block diagram illustrating a readout integrated circuit and an optical sensing panel according to an embodiment of the disclosure.
Figure 2:
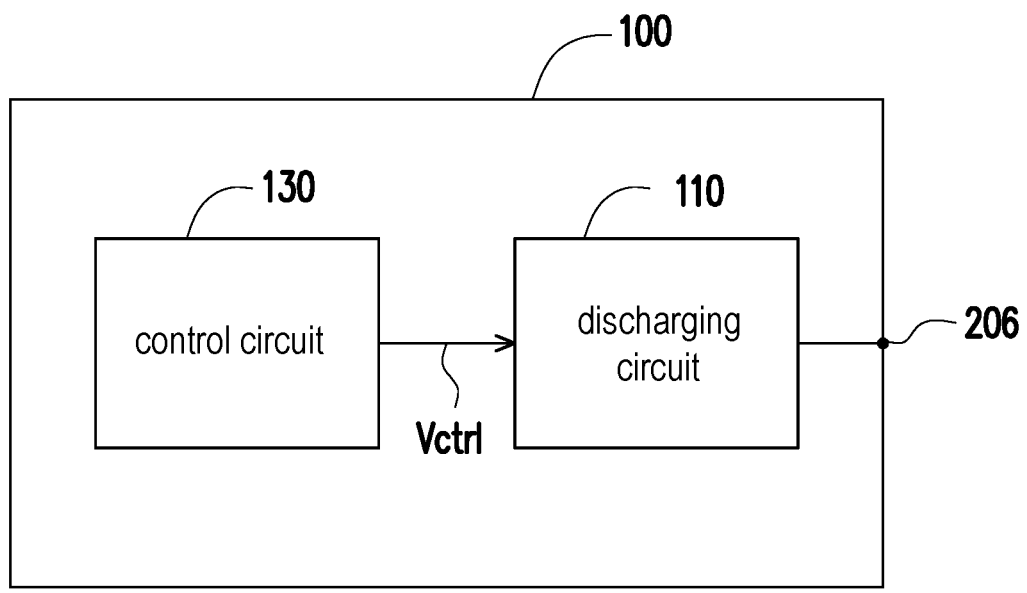
FIG. 2 is a schematic block diagram illustrating the readout integrated circuit depicted in FIG. 1 according to an embodiment of the disclosure.
Figure 3:
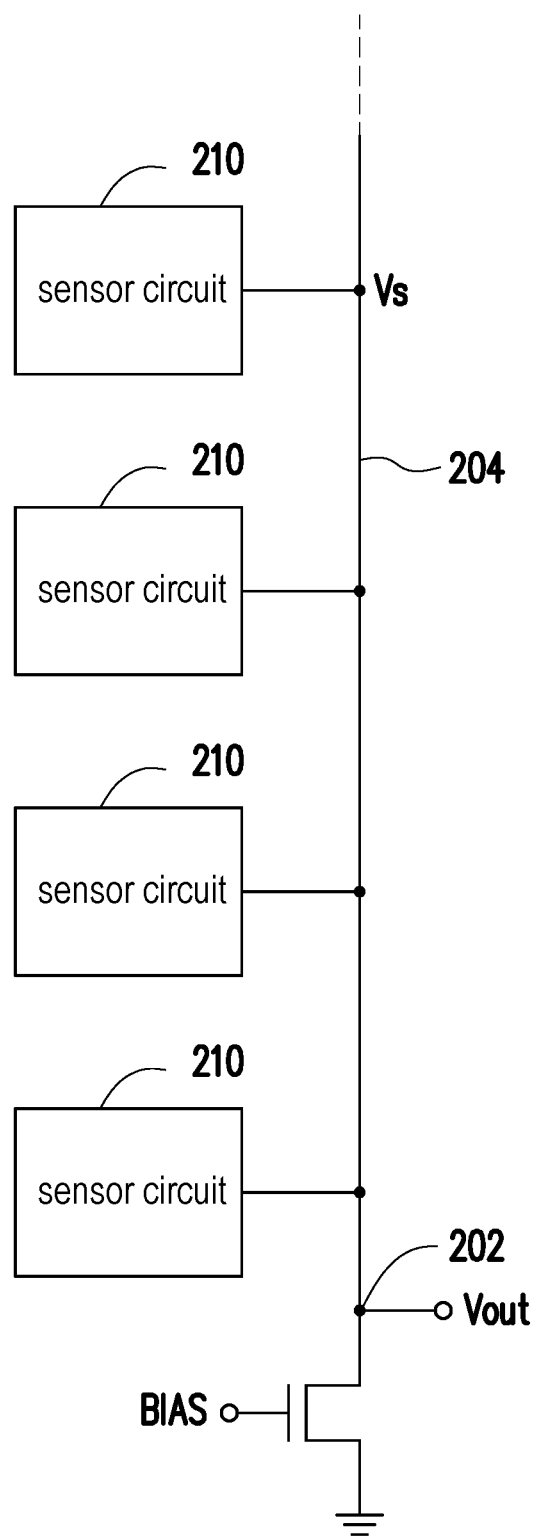
FIG. 3 is a schematic diagram illustrating a plurality of sensor circuits arranged in a column of a sensor array in the optical sensing panel depicted in FIG. 1 according to an embodiment of the disclosure.

FIG. 1 is a schematic block diagram illustrating a readout integrated circuit and an optical sensing panel according to an embodiment of the disclosure. In this embodiment, the optical sensing panel is an in-display fingerprint sensing panel which is fabricated in a display panel. FIG. 2 is a schematic block diagram illustrating the readout integrated circuit depicted in FIG. 1 according to an embodiment of the disclosure. FIG. 3 is a schematic diagram illustrating a plurality of sensor circuits arranged in a column of a sensor array in the optical sensing panel 200 depicted in FIG. 1 according to an embodiment of the disclosure.

Referring to FIG. 1 to FIG. 3, an optical sensing panel 200 includes a sensor array formed by a plurality of sensor circuits 210 serving as sensing pixels, a plurality of sensing lines 204, and a plurality of output terminals 202 which are capable of outputting fingerprint sensing signals. Each column of sensor circuits is coupled to a respective sensing line 204. The number of the output terminals 202 of the optical sensing panel 200 may be the same as or less than the number of the sensing lines 204.

A readout integrated circuit 100 includes a plurality of input terminals 206, and the plurality of input terminals 206 are configured to be coupled to some of the plurality of output terminals 202 of the optical sensing panel 200. It is noted that, for a current fingerprint sensing operation, the number of fingerprint sensing signals being processed at the same time by the readout integrated circuit 100 is determined based on circuit design of the readout integrated circuit 100, which may be related but not limited to the number of analog front-end circuits in the readout integrated circuit 100 that can parallel process the received fingerprint sensing signals. The locations and the quantity of the sensor circuits which are active for a current fingerprint sensing operation may not be all of the sensor circuits of the optical sensing panel 200. These active sensor circuits for a current fingerprint sensing operation may be a predetermined part of the sensor array or may be determined according to a touch position with respect to a touch event. In an example, the optical sensing panel 200 may have 1080 columns of sensor circuits, 1080 sensing lines and 1080 output terminals, and the readout integrated circuit 100 includes 250 input terminals, such that only 250 output terminals of the 1080 output terminals of the optical sensing panel 200 are respectively coupled to the 250 input terminals of the readout integrated circuit 100. Thus, at the same time, fingerprint sensing signals generated from 250 sensor circuits among a row can be transmitted to the readout integrated circuit 100 through the 250 output terminals.

In FIG. 3, only the sensor circuits 210 coupled to the same sensing line 204 are illustrated for example, but the disclosure is not limited thereto. In view point of the readout integrated circuit 100, the input terminals 206 of the readout integrated circuit 100 are coupled to a part of the sensing lines 204 via a part of the output terminals 202. The readout integrated circuit 100 is configured to read out an output voltage Vout of the output terminal 202, which is ideally expected to be equivalent to an output voltage of a sensor circuit, called a sensing voltage Vs. However, more distance from the sensor circuit to the output terminal 202, more load resulted from the resistance and capacitance of the sensing line 204, and it costs more time to make the output voltage Vout of the output terminal 202 settle to the sensing voltage Vs. It should be noted that, regarding the output voltage Vout of the output terminals 202 during a readout period, a process from the output voltage Vout at the beginning of a readout period to the sensing voltage Vs that the sensor circuit actually outputs may be regarded as a discharging process if the output voltage Vout at the beginning of the readout period is higher than the sensing voltage Vs. Herein, the output voltage Vout of the output terminals 202 at the beginning of the readout period is determined based on a circuit design of the readout integrated circuit. The following embodiments about FIG. 5 to FIG. 9 is illustrated based on the case that the output voltage Vout settling (to the sensing voltage Vs) is as a discharging process. In other embodiments, e.g. FIG. 11 and FIG. 12, a process from the output voltage Vout at the beginning of the readout period to the sensing voltage Vs that the sensor circuit actually outputs may be regarded as a charging process if the output voltage Vout at the beginning of the readout period is lower than the sensing voltage Vs that the sensor circuit actually outputs. The output voltage Vout of the output terminals 202 at the beginning of the readout period is called an initial voltage hereinafter. The initial voltage may be determined by a pre-charging process which is described in the following.

Figure 5:
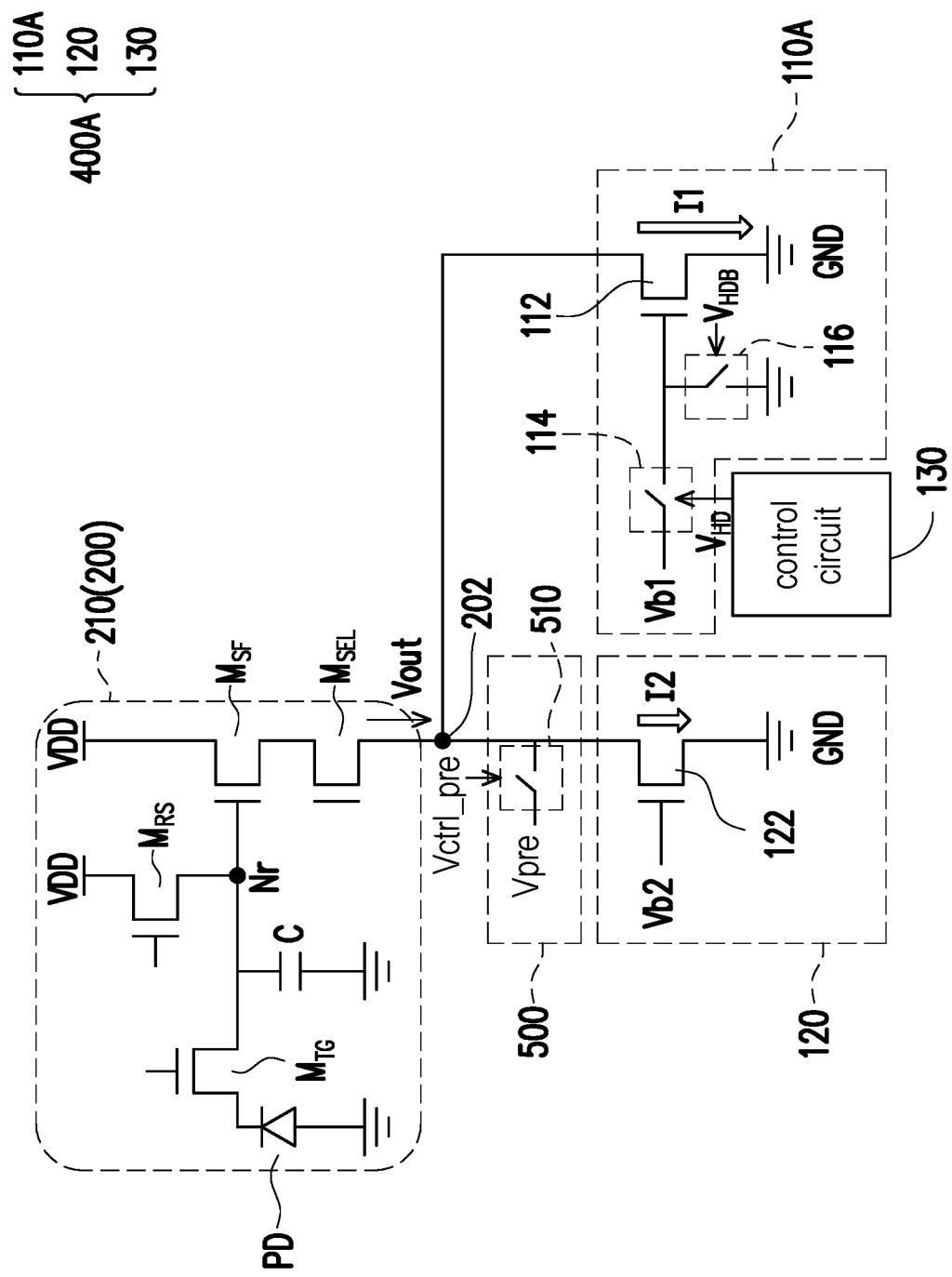
FIG. 5 is a schematic diagram illustrating a sensor circuit with N-type transistors and a readout integrated circuit according to an embodiment of the disclosure.

The readout integrated circuit 100 further includes a first discharging circuit 110 and a control circuit 130. The first discharging circuit 110 is coupled to one of the input terminal 206 as illustrated in FIG. 2. That is, the first discharging circuit 110 is coupled to one of the output terminals 202 of the optical sensing panel 200 via the input terminal 206. In an implementation, since the first discharging circuit 110 may serve multiple output terminals 202, the first discharging circuit 110 may be coupled to multiple input terminals 206 and then coupled to corresponding output terminals 202 through the input terminals 206. The first discharging circuit 110 is configured to discharge the output terminal 202 or more output terminals 202 by a first current I1 as shown in FIG. 5 during a readout period. The readout integrated circuit 100 reads out an output voltage Vout of the output terminal 202 as a sensing signal (or reads out more voltages Vout of the plurality of output terminals 202 as the sensing signals). The control circuit 130 is coupled to the first discharging circuit 110, and configured to output at least one control signal Vctrl to control an operating period of the first discharging circuit 110.

Figure 4:
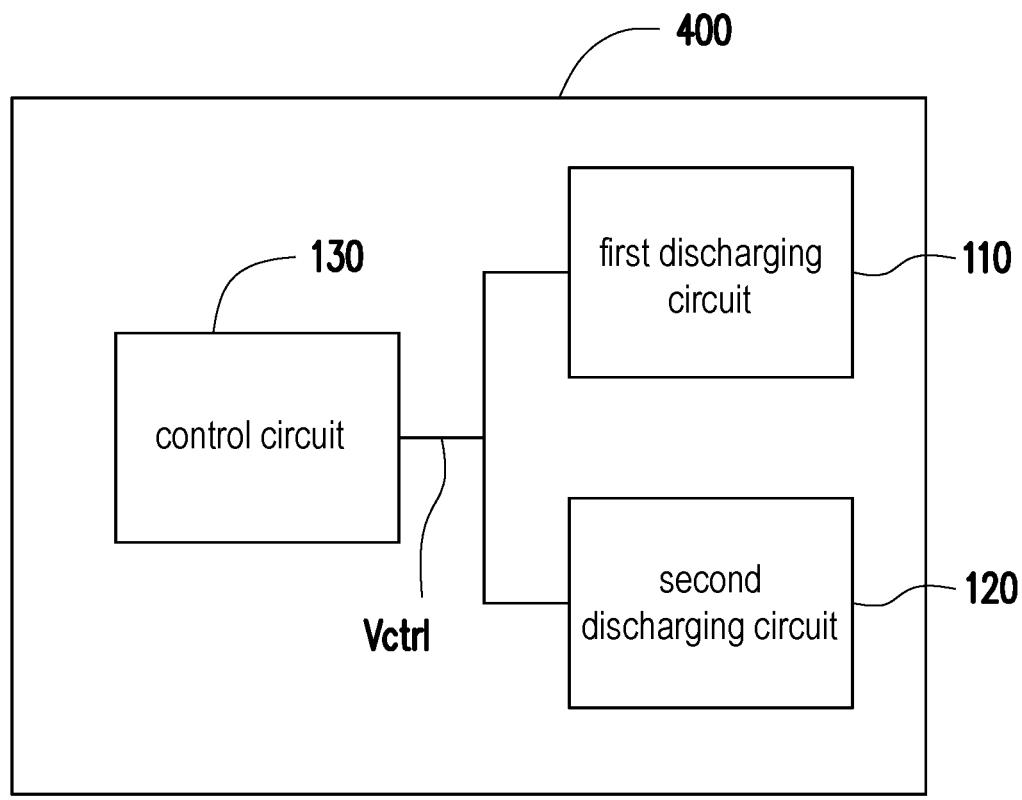
FIG. 4 is a schematic block diagram illustrating a readout integrated circuit according to another embodiment of the disclosure.

FIG. 4 is a schematic block diagram illustrating a readout integrated circuit according to another embodiment of the disclosure. Referring to FIG. 2 and FIG. 4, the readout integrated circuit 400 of the present embodiment is similar to the readout integrated circuit 100 of FIG. 2, and the main difference therebetween, for example, lies in that the readout integrated circuit 400 further includes a second discharging circuit 120. The second discharging circuit 120 is coupled to the output terminal 202 (or more output terminals 202) of the optical sensing panel 200 as illustrated in FIG. 3. The second discharging circuit 120 is configured to discharge the output terminal 202 (or more the plurality of output terminals 202) by a second current I2 as shown in FIG. 5 during the readout period.

FIG. 5 is a schematic diagram illustrating a sensor circuit with N-type transistors and a readout integrated circuit according to an embodiment of the disclosure. FIG. 5 is illustrated based on that the process that the output voltage Vout settling to steady state (i.e. to arrive at the sensing voltage Vs) is regarded as a discharging process. Referring to FIG. 5, the readout integrated circuit 400A includes the first discharging circuit 110A, the second discharging circuit 120 and the control circuit 130. In addition, a pre-charging circuit 500 is coupled to an output terminal 202 of the optical sensing panel 200. Circuit structures of the sensor circuit 210, the first discharging circuit 110A, the second discharging circuit 120 and the pre-charging circuit 500 are further illustrated in FIG. 5. However, the circuit structures thereof do not intend to limit the disclosure. In another embodiment based on that the process that the output voltage Vout settling to steady state (i.e. to arrive at the sensing voltage Vs) is regarded as a charging process. The first discharging circuit 110A may be replaced with a first charging circuit including similar switch elements and a current source providing a current as an inverse first current I1, to charge the output terminal 202, and wherein the reference voltage may be a supply voltage. The control circuit 130 can also be used for controlling the operating period of the first charging circuit.

In FIG. 5, an active pixel structure of four N-type transistors is taken as an example for the sensor circuit 210. In a reset period, a reset transistor MRS is conducted, and a voltage at a node Nr is pulled up to a high voltage VDD, and the source follower formed by the transistor MSF is in an off-state. At the reset period, an output voltage Vout of the output terminal 202 is discharged. In an exposure period, a photo-sensing mechanism is performed, and a photodiode PD is leaking. In a readout period, a select transistor MSEL is conducted, and then the reset transistor MRS is conducted again. Next, a transfer transistor MTG is conducted, and a sensing voltage with respect to fingerprint information is transmitted to the node Nr. Therefore, the voltage at the node Nr changes from the high voltage VDD to the sensing voltage, which is lower than the high voltage VDD. In the readout period, the output voltage Vout at the steady state is determined by the voltage at the node Nr. For example, when the voltage at the node Nr in the readout period is a voltage 2V, the output voltage Vout at the steady state is approximate to a voltage 2V−Vgs, where Vgs is a voltage difference between a gate terminal and a source terminal of the source follower formed by a transistor MSF. Therefore, the output voltage Vout is read out in the readout period, and serves as a sensing signal. The initial voltage of the output terminal 202 at the beginning of the readout period may be determined in a pre-charging process by a pre-charging voltage Vpre. The pre-charging period is earlier than the readout period.

The first discharging circuit 110A includes a first current source 112, a first switch element 114 and a second switch element 116. The first current source 112 is controlled by a first voltage Vb1 to generate the first current I1. The first current source 112 include a first terminal, a second terminal and a control terminal. The first current I1 is transmitted from the first terminal to the second terminal. The first terminal of the first current source 112 is coupled to the output terminal 202. The second terminal of the first current source 112 is coupled to a reference voltage. The control terminal of the first current source 112 is coupled to the first voltage Vb1. In the present embodiment, the reference voltage may be a ground voltage GND, but the disclosure is not limited thereto.

The first switch element 114 is controlled by a first control signal $V_{HD}$. The first switch element 114 includes a first terminal, a second terminal and a control terminal. The first terminal of the first switch element 114 is coupled to the first voltage Vb1. The second terminal of the first switch element 114 is coupled to the control terminal of the first current source 112. The control terminal of the first switch element 114 is coupled to the first control signal $V_{HD}$.

The second switch element 116 is controlled by a second control signal $V_{HDB}$. The second switch element 116 includes a first terminal, a second terminal and a control terminal. The first terminal of the second switch element 116 is coupled to the control terminal of the first current source 112. The second terminal of the second switch element 116 is coupled to the reference voltage GND. The control terminal of the second switch element 116 is coupled to the second control signal $V_{HDB}$. In the present embodiment, the second control signal $V_{HDB}$ is inverted from the first control signal $V_{HD}$. The second control signal $V_{HDB}$ is an inverse signal of the first control signal $V_{HD}$. When the first switch element 114 is conducted by the first control signal $V_{HD}$, the second switch element 116 is not conducted. When the second switch element 116 is conducted by the second control signal $V_{HDB}$, the first switch element 114 is not conducted. The second switch element 116 can be conducted to ensure the first current source 112 is turned off.

The second discharging circuit 120 is coupled to the output terminal 202 of the optical sensing panel 200. The second discharging circuit 120 is configured to discharge the output terminal 202 by a second current I2 during the readout period. The second discharging circuit 120 includes a second current source 122. The second current source 122 is controlled by a second voltage Vb2 to generate the second current I2. The second current source 122 includes a first terminal, a second terminal and a control terminal. The second current I2 is transmitted from the first terminal to the second terminal. The first terminal of the second current source 122 is coupled to the output terminal 202. The second terminal of the second current source 122 is coupled to the reference voltage GND. The control terminal of the second current source 122 is coupled to the second voltage Vb2.

In an embodiment, the first current I1 is larger than the second current I2, such that the discharging operation is dominated by the first discharging circuit 110A, but the disclosure is not limited thereto. In another embodiment, the first current I1 may be equal to the second current I2. The power consumption of the optical sensing panel 200 may be reduced because power consumption regarding to the first current source 112 belongs to power consumption of the readout integrated circuit 100, not to the optical sensing panel 200. The control circuit 130 is coupled to the first discharging circuit 110A. The control circuit 130 outputs at least one control signal to control an operating period of the first discharging circuit 110A. For example, the control circuit 130 may output the first control signal $V_{HD}$ and the second control signal $V_{HDB}$ to control the operating period of the first discharging circuit 110A. The operating period of the first discharging circuit 110A indicates a period that the first discharging circuit 110A discharges the output terminal 202 of the optical sensing panel 200.

In an embodiment, the control circuit 130 may include a controller implemented by one or more processing elements, such as an array of logic gates, an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

The pre-charging circuit 500 is coupled to the output terminal 202 of the optical sensing panel 200. The pre-charging circuit 500 is configured to charge the output terminal 202 to an initial voltage during a pre-charging period. The pre-charging period is earlier than the readout period. The pre-charging circuit 500 includes a third switch element 510. The third switch element 510 is controlled by a third control signal Vctrl_pre. The third switch element 510 includes a first terminal, a second terminal and a control terminal. The first terminal of the third switch element 510 is coupled to the output terminal 202. The second terminal of the third switch element 510 is coupled to a pre-charging voltage Vpre. The control terminal of the third switch element 510 is coupled to the third control signal Vctrl_pre. When the third switch element 510 is conducted by the third control signal Vctrl_pre, the output terminal 202 is charged to the initial voltage during the pre-charging period. The third control signal Vctrl_pre may be outputted from the control circuit 130 or other external control circuits.

In the present embodiment, the second discharging circuit 120 and the pre-charging circuit 500 are disposed in the readout integrated circuit 400A. That is to say, the readout integrated circuit 400A includes the second discharging circuit 120 and the pre-charging circuit 500 and is implemented in a single semiconductor chip or circuitry, but the disclosure is not limited thereto. In an embodiment, the second discharging circuit 120, the pre-charging circuit 500, and the readout integrated circuit 400A can be implemented in separate devices. For example, the second discharging circuit 120 and the pre-charging circuit 500 are disposed in a display panel where the optical sensing panel 200 is embedded.

Figure 6:
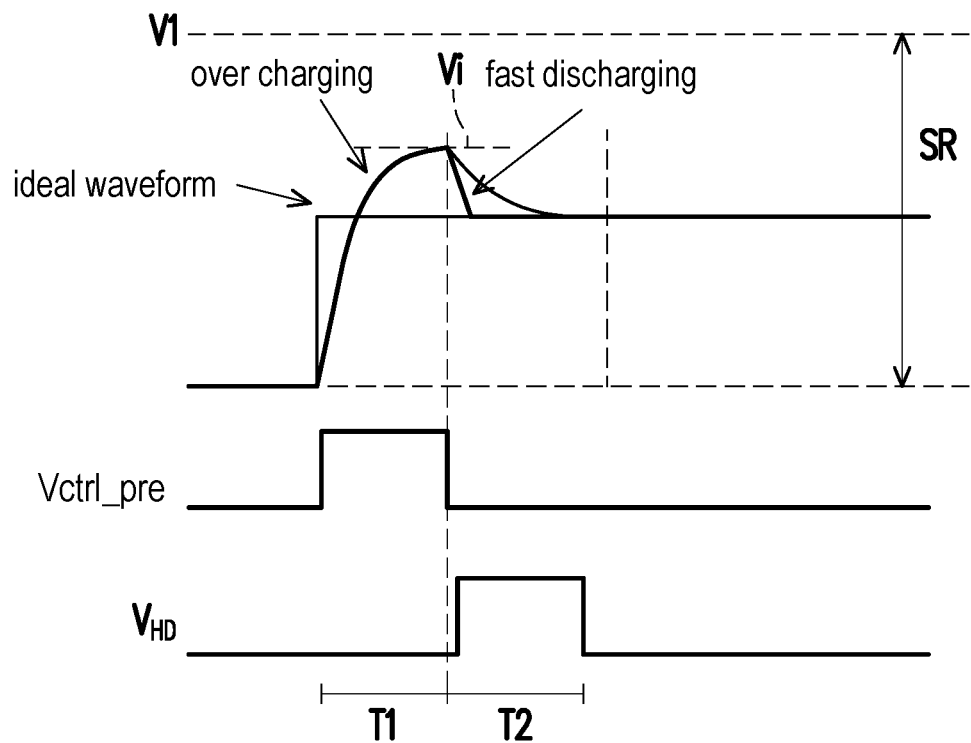
FIG. 6 is a waveform diagram of a voltage at the output terminal during different operation periods according to an embodiment of the disclosure.

FIG. 6 is a waveform diagram of a voltage at the output terminal during different operation periods according to an embodiment of the disclosure. Referring to FIG. 5 and FIG. 6, the pre-charging circuit 500 charges the output terminal 202 to the initial voltage Vi during the pre-charging period T1. The first discharging circuit 110A and the second discharging circuit 120 discharge the output terminal 202 during the readout period T2, such that a discharging speed of the output voltage Vout can become faster. The settling time of the fingerprint sensing signals, i.e. the output voltages Vout, is short to improve the quality of the fingerprint image. The settling time is the time required for the output voltage Vout to reach and remain within a given band. The readout period T2 is an operating period of the first discharging circuit 110A, and a time span of the operating period is controlled by the first control signal $V_{HD}$.

In the present embodiment, the output voltage Vout may be transmitted to an analog-front-end circuit (not shown) then to an analog-to-digital converter (not shown) in the readout integrated circuit 400, or may be transmitted to the analog-to-digital converter in the readout integrated circuit 400 without being processed through the analog-front-end circuit if there is no analog-front-end circuit. A signal range SR is an input voltage range of the analog-to-digital converter. The output terminal 202 is pre-charged to a voltage level which is lower than a highest input voltage V1 of the analog-to-digital converter during the pre-charging period, but the disclosure is not limited thereto. In an embodiment, the output terminal 202 may be pre-charged to the voltage level which is approximate to the highest input voltage V1 of the analog-to-digital converter during the pre-charging period.

Figure 7:
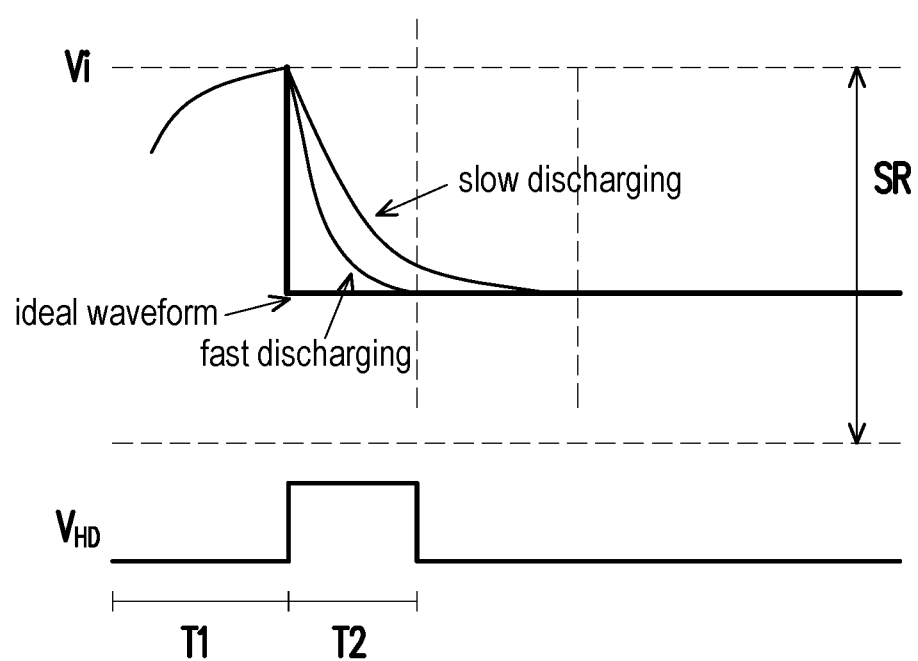
FIG. 7 is a waveform diagram of a voltage at the output terminal during different operation periods according to another embodiment of the disclosure.

FIG. 7 is a waveform diagram of a voltage at the output terminal during different operation periods according to another embodiment of the disclosure. Referring to FIG. 5 and FIG. 7, the output terminal 202 is pre-charged to the initial voltage V1, and the voltage level of the initial voltage V1 is approximate to the highest input voltage V1 of the analog-to-digital converter during the pre-charging period T1. The first discharging circuit 110A and the second discharging circuit 120 further discharge the output terminal 202 during the readout period T2, such that a discharging speed of the output voltage can become faster. In addition, the pre-charging operation may be performed during the reset period, before the readout period (which means an exposure period), or an early stage of the readout period before the select switch $M_{SEL}$ is conducted.

Figure 8:
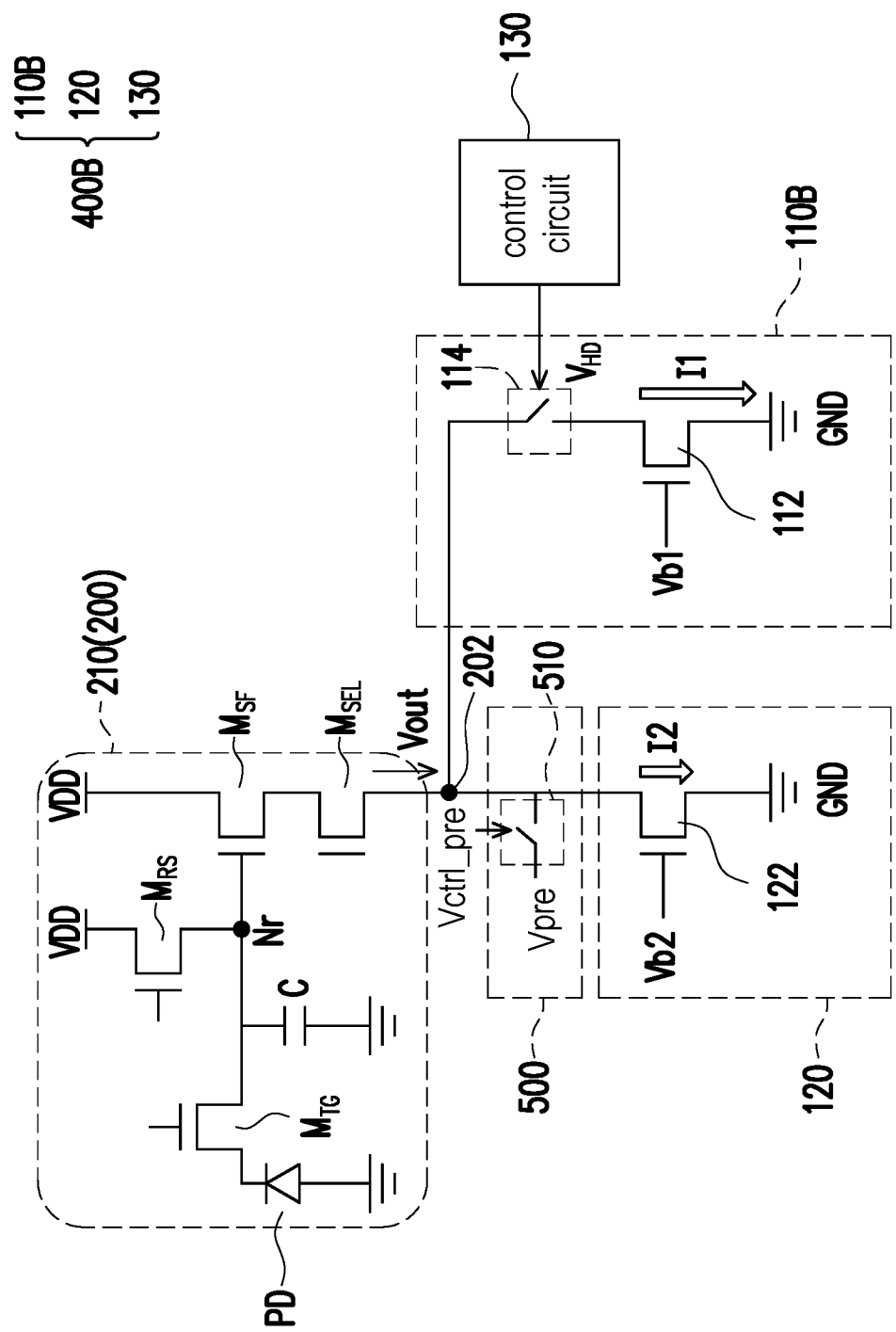
FIG. 8 is a schematic diagram illustrating a sensor circuit with N-type transistors and a readout integrated circuit according to another embodiment of the disclosure.

FIG. 8 is a schematic diagram illustrating a sensor circuit with N-type transistors and a readout integrated circuit according to another embodiment of the disclosure. Referring to FIG. 5 and FIG. 8, the readout integrated circuit 400B of the present embodiment is similar to the readout integrated circuit 400A of FIG. 5, and the main difference therebetween, for example, lies in the circuit structure of the first discharging circuit 110B.

To be specific, the first discharging circuit 110B includes the first current source 112 and the first switch element 114. The first switch element 114 is controlled by the first control signal $V_{HD}$. The first switch element 114 include a first terminal, a second terminal and a control terminal. The first terminal of the first switch element 114 is coupled to the output terminal 202. The second terminal of the first switch element 114 is coupled to the first terminal of the first current source 112. The control terminal of the first switch element 114 is coupled to the first control signal $V_{HD}$. The control circuit 130 can directly turn on or turn off a discharging path of the output voltage Vout by controlling a conduction state of the first switch element 114.

The operation of the readout integrated circuit 400B, the second discharging circuit 120 and the pre-charging circuit 500 described in the embodiment of the disclosure is sufficiently taught, suggested, and embodied in the embodiments illustrated in FIG. 5, and therefore no further description is provided herein.

Figure 9:
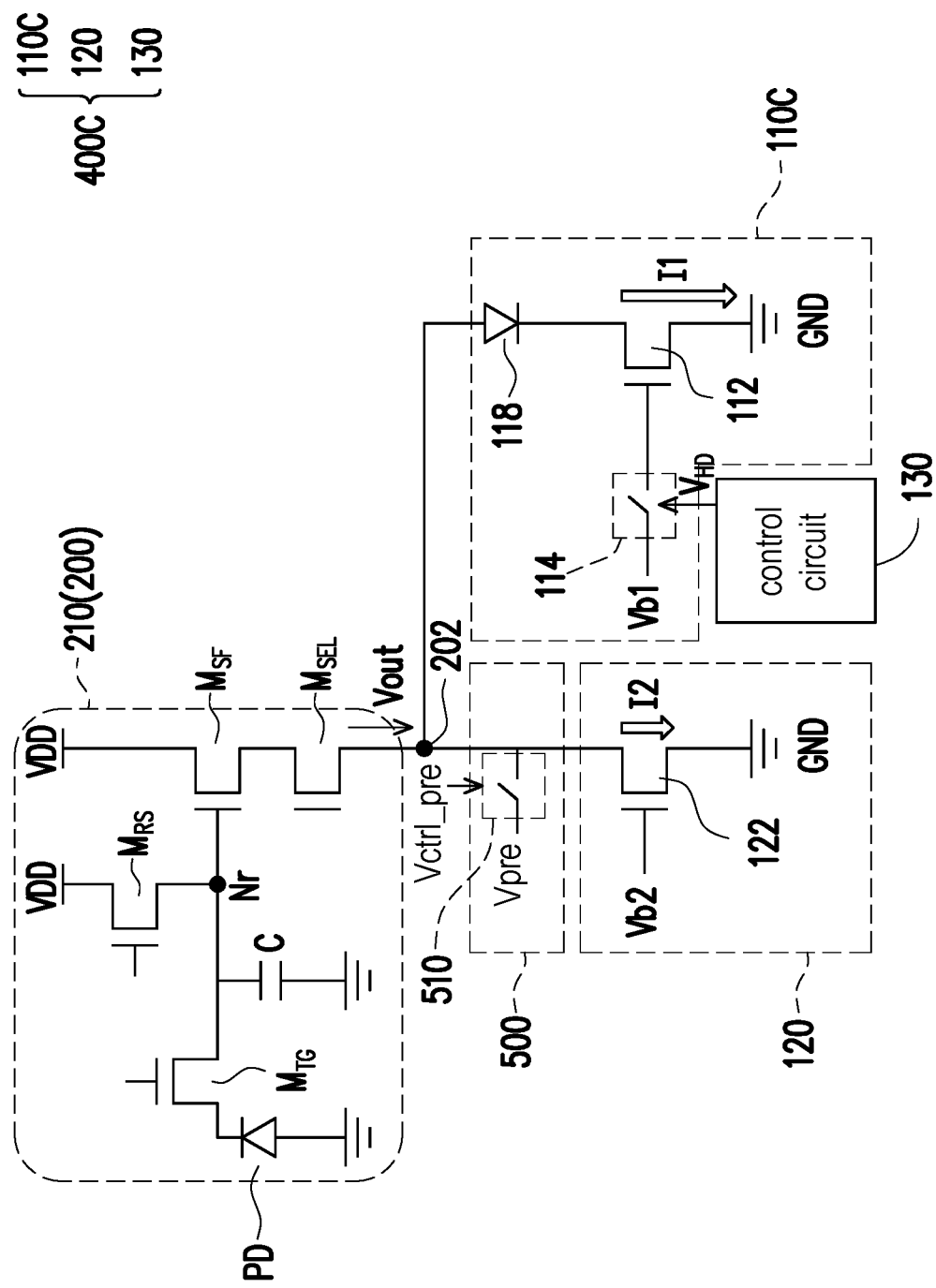
FIG. 9 is a schematic diagram illustrating a sensor circuit with N-type transistors and a readout integrated circuit according to another embodiment of the disclosure.

FIG. 9 is a schematic diagram illustrating a sensor circuit with N-type transistors and a readout integrated circuit according to another embodiment of the disclosure. Referring to FIG. 5 and FIG. 9, the readout integrated circuit 400C of the present embodiment is similar to the readout integrated circuit 400A of FIG. 5, and the main difference therebetween, for example, lies in the circuit structure of the first discharging circuit 110C.

To be specific, the first discharging circuit 110C includes the first current source 112, the first switch element 114, and a diode element 118. The first switch element 114 is controlled by the first control signal $V_{HD}$. The first switch element 114 includes a first terminal, a second terminal and a control terminal. The first terminal of the first switch element 114 is coupled to the first voltage Vb1. The second terminal of the first switch element 114 is coupled to the control terminal of the first current source 112. The control terminal of the first switch element 114 is coupled to the first control signal $V_{HD}$. The diode element 118 includes an anode terminal and a cathode terminal. The anode terminal of the diode element 118 is coupled to the output terminal 202, and the cathode terminal of the diode element 118 is coupled to the first terminal of the first current source 112.

The diode element 118 can avoid that the output voltage Vout is pulled down to a specified voltage. For example, when the output voltage Vout is pulled down to the specified voltage, the diode element 118 is not conducted, such that the first current source 112 is turned off to stop the discharging operation.

The operation of the readout integrated circuit 400C, the second discharging circuit 120 and the pre-charging circuit 500 described in the embodiment of the disclosure is sufficiently taught, suggested, and embodied in the embodiments illustrated in FIG. 5, and therefore no further description is provided herein.

Figure 10:
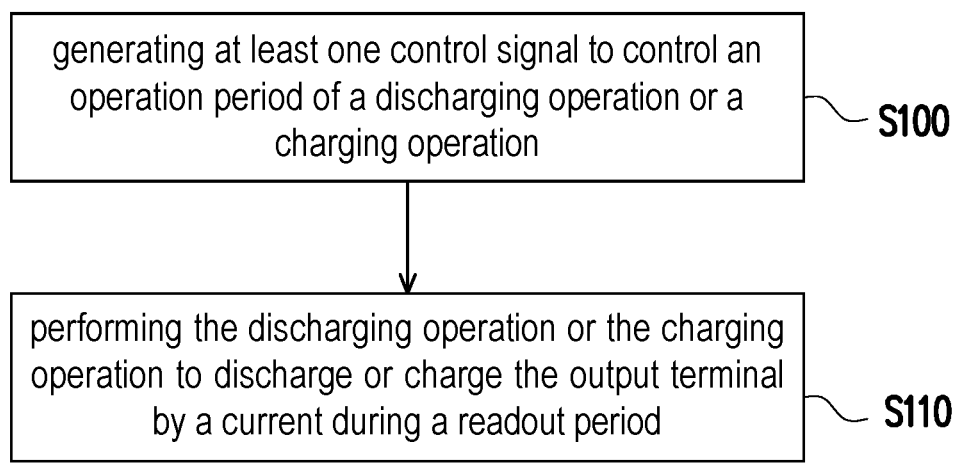
FIG. 10 is a flowchart illustrating a method for operating a readout integrated circuit according to an embodiment of the disclosure.

FIG. 10 is a flowchart illustrating a method for operating a readout integrated circuit according to an embodiment of the disclosure. Referring to FIG. 10, in the present embodiment, the method for operating the readout integrated circuit is at least adapted to the readout integrated circuit 100 depicted in FIG. 1 and FIG. 2. Taking the readout integrated circuit 100 for example, in step S100, the readout integrated circuit 100 generates at least one control signal Vctrl to control an operation period of a discharging operation. In step S110, the readout integrated circuit 100 performs the discharging operation to discharge the output terminal 202 by a current during a readout period. Therefore, voltages of the plurality of output terminals 202 of the sensor array included in the optical sensing panel 200 can be read out as the sensing signals. In other embodiment, the method shown in FIG. 10 may adapted to a readout integrated circuit 600 depicted in FIG. 11. For example, in step S100, the readout integrated circuit 600 generates at least one control signal Vctrl to control an operation period of a charging operation. In step S110, the readout integrated circuit 600 performs the charging operation to charge an output terminal 702 of an optical sensing panel 200p shown in FIG. 13 by a current during a readout period. Therefore, voltages of the plurality of output terminals 702 of the sensor array included in the optical sensing panel 200p can be read out as the sensing signals.

Figure 11:
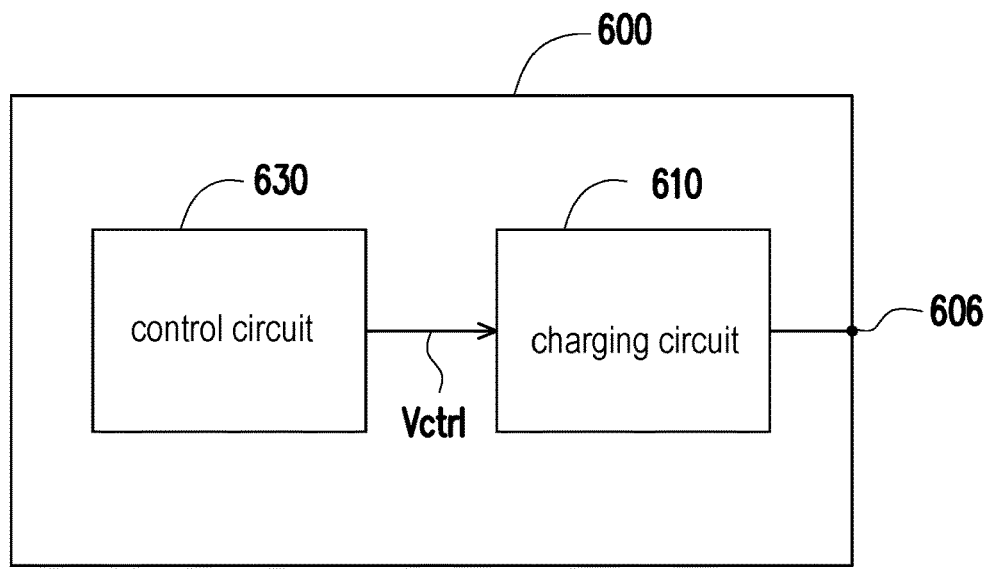
FIG. 11 is a schematic block diagram illustrating a readout integrated circuit according to another embodiment of the disclosure.
Figure 13:
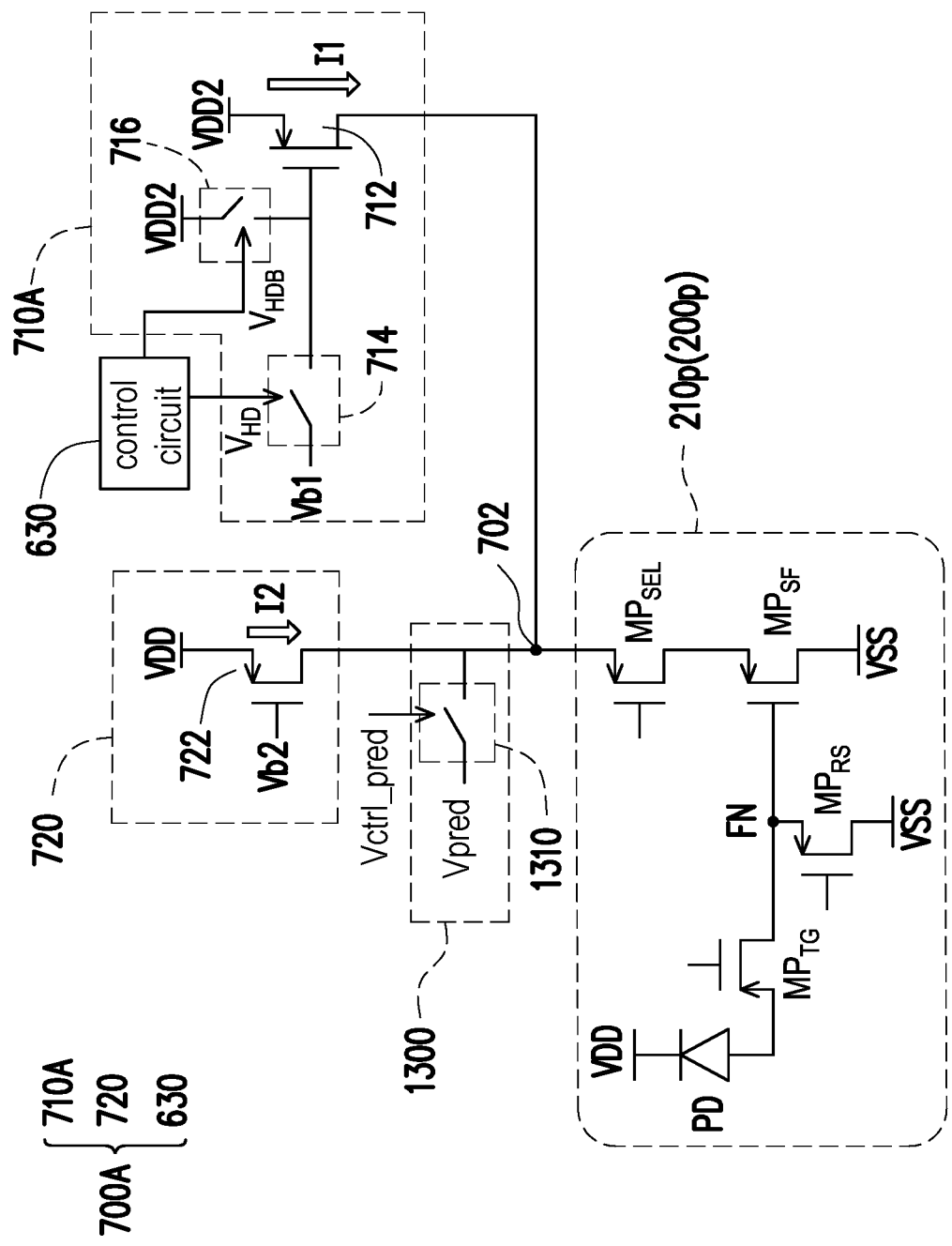
FIG. 13 is a schematic diagram illustrating a sensor circuit with P-type transistors and a readout integrated circuit according to an embodiment of the disclosure.

FIG. 11 is a schematic block diagram illustrating a readout integrated circuit according to another embodiment of the disclosure. Referring to FIG. 11, a readout integrated circuit 600 includes a plurality of input terminals 606, and the plurality of input terminals 606 are configured to be coupled to some of the plurality of output terminals 702 of the optical sensing panel 200p as illustrated in FIG. 13. The readout integrated circuit 600 further includes a first charging circuit 610 and the control circuit 630. The first charging circuit 610 is coupled to an input terminal 606 (or more input terminals 606) as illustrated in FIG. 11. That is, the first charging circuit 610 is coupled to an output terminal 702 of the optical sensing panel 200p via the input terminal 606. The first charging circuit 610 is configured to charge the output terminal 702 by a first current I1 during a readout period. The readout integrated circuit 600 reads out the voltage Vout of the output terminal 702 as the sensing signal. The control circuit 630 is coupled to the first charging circuit 610, and configured to output at least one control signal Vctrl to control an operating period of the first charging circuit 610.

Figure 12:
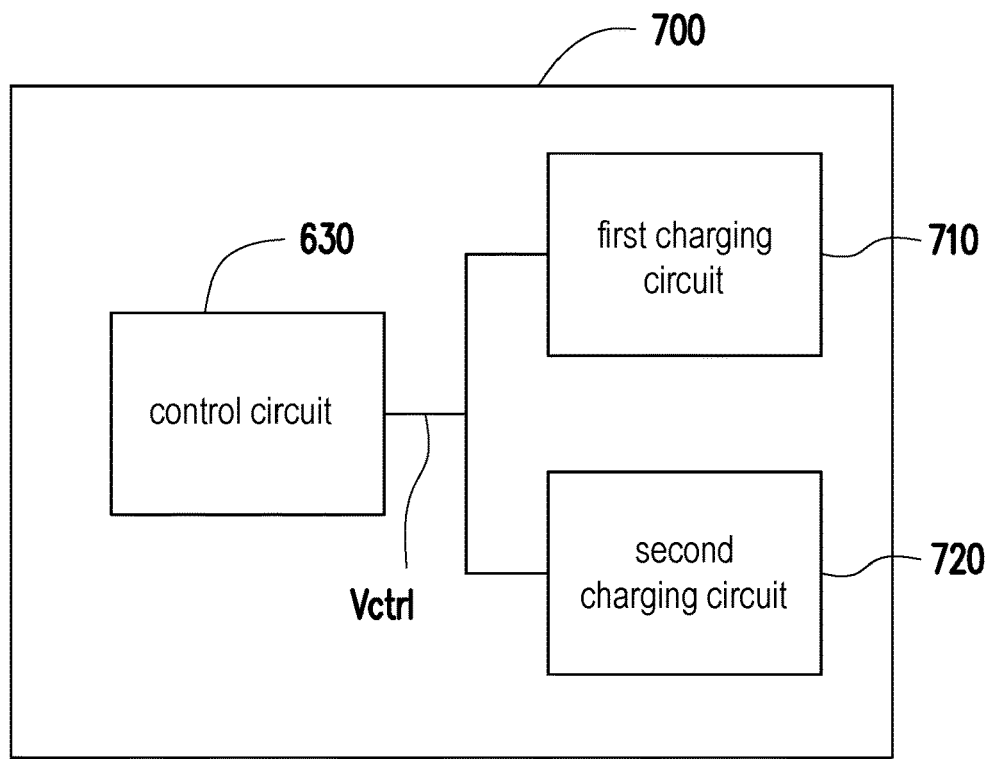
FIG. 12 is a schematic block diagram illustrating a readout integrated circuit according to another embodiment of the disclosure.

FIG. 12 is a schematic block diagram illustrating a readout integrated circuit according to another embodiment of the disclosure. Referring to FIG. 11 and FIG. 12, the readout integrated circuit 700 of the present embodiment is similar to the readout integrated circuit 600 of FIG. 11, and the main difference therebetween, for example, lies in that the readout integrated circuit 700 further includes a second charging circuit 720. The second charging circuit 720 is coupled to the output terminal 702 of the optical sensing panel 200p as illustrated in FIG. 13. The second charging circuit 720 is configured to charge the output terminal 702 by a second current I2 as illustrated in FIG. 13 during the readout period.

In the embodiments of FIG. 11 and FIG. 12, a process from the output voltage Vout at the beginning of the readout period to the sensing voltage Vs that the sensor circuit actually outputs may be regarded as a charging process if the output voltage Vout at the beginning of the readout period is lower than the sensing voltage Vs that the sensor circuit actually outputs. The output voltage Vout of the output terminals 702 at the beginning of the readout period is called an initial voltage. The initial voltage may be determined by a pre-discharging process.

FIG. 13 is a schematic diagram illustrating a sensor circuit with P-type transistors and a readout integrated circuit according to an embodiment of the disclosure. Based on the sensor circuit 210p shown in FIG. 13, the output voltage Vout settling to steady state is regarded as a charging process. The readout integrated circuit 700A includes a first charging circuit 710A, a second charging circuit 720 and a control circuit 630. In addition, a pre-discharging circuit 1300 is coupled to an output terminal 702 of the optical sensing panel 200p. The first charging circuit 710A is coupled to a high voltage VDD2 different from another high voltage VDD that the second charging circuit 720 is coupled to, and the first charging circuit 710A may provide the first current I1 to charge the output terminal 702. The second charging circuit 720 may provide the second current I2 to charge the output terminal 702. The control circuit 630 may be used for controlling the operating period of the first charging circuit 710A.

In FIG. 13, an active pixel structure of four P-type transistors is taken as an example for the sensor circuit 210p. In a reset period, a reset transistor $MP_{RS}$ and a transfer transistor $MP_{TG}$ are respectively conducted for a short period such that a voltage at a node FN is pulled to a low voltage VSS. In an exposure period, a photo-sensing mechanism is performed, and a photodiode PD is leaking. In view of the sensor circuit, the exposure period starts at a time point when the transfer transistor $MP_{TG}$ is turned off from the on-state and ends at a time point when the transfer transistor $MP_{TG}$ is turned off from the on-state again. In view of the readout integrated circuit 700A, in a readout period, a select transistor $MP_{SEL}$ is conducted (while the photodiode PD is still in exposure), and then the reset transistor $MP_{RS}$ is conducted for a short period again to reset the voltage at the node FN. Therefore, the readout integrated circuit 700A readouts (by signal sampling) the output voltage Vout (as the voltage of the output terminal 702) to be taken as a reference signal. Next, the transfer transistor $MP_{TG}$ is conducted for a short period again, and a sensing voltage with respect to fingerprint information is transmitted to the node FN. The voltage at the node FN changes from the low voltage VSS to the sensing voltage Vs, which is higher than the low voltage VSS. In the readout period, the output voltage Vout at the steady state is determined by the voltage at the node FN, and the output voltage Vout is readout (by signal sampling) by the readout integrated circuit 700A to be taken as a sensing signal. For example, when the voltage at the node FN in the readout period is a voltage 2V, the output voltage Vout at the steady state is approximate to a voltage 2V+Vsg, where Vsg is a voltage difference between a gate terminal and a source terminal of a source follower formed by the transistor $MP_{SF}$. The initial voltage of the output terminal 702 at the beginning of the readout period may be determined in a pre-discharging process by a pre-discharging voltage Vpred. The pre-discharging period is earlier than the readout period.

The first charging circuit 710A includes a first current source 712, a first switch element 714 and a second switch element 716. The first current source 712 is controlled by a first voltage Vb1 to generate the first current I1. The first current source 712 include a first terminal, a second terminal and a control terminal. The first terminal of the first current source 712 is coupled to the output terminal 702. The second terminal of the first current source 712 is coupled to a high voltage VDD. The first current I1 is transmitted from the second terminal to the first terminal. The control terminal of the first current source 712 is coupled to the first voltage Vb1.

The first switch element 714 is controlled by a first control signal $VH_D$. The first switch element 714 includes a first terminal, a second terminal and a control terminal. The first terminal of the first switch element 714 is coupled to the first voltage Vb1. The second terminal of the first switch element 714 is coupled to the control terminal of the first current source 712. The control terminal of the first switch element 714 is coupled to the first control signal $V_{HD}$.

The second switch element 716 is controlled by a second control signal $V_{HDB}$. The second switch element 716 includes a first terminal, a second terminal and a control terminal. The first terminal of the second switch element 716 is coupled to a high voltage VDD2. The second terminal of the second switch element 716 is coupled to the control terminal of the first current source 712. The control terminal of the second switch element 716 is coupled to the second control signal $V_{HDB}$. In the present embodiment, the second control signal $V_{HDB}$ is inverted from the first control signal $V_{HD}$. In other words, the second control signal $V_{HDB}$ is an inverse signal of the first control signal $V_{HD}$. When the first switch element 714 is conducted by the first control signal $V_{HD}$, the second switch element 716 is not conducted. When the second switch element 716 is conducted by the second control signal $V_{HDB}$, the first switch element 714 is not conducted. The second switch element 716 can be conducted to ensure the first current source 712 is turned off.

The second charging circuit 720 is coupled to the output terminal 702 of the optical sensing panel 200p. The second charging circuit 720 is configured to charge the output terminal 702 by a second current I2 during the readout period. The second charging circuit 720 includes a second current source 722. The second current source 722 is controlled by a second voltage Vb2 to generate the second current I2. The second current source 722 includes a first terminal, a second terminal and a control terminal. The second current I2 is transmitted from the first terminal to the second terminal. The first terminal of the second current source 722 is coupled to a high voltage VDD. The second terminal of the second current source 722 is coupled to the output terminal 702. The control terminal of the second current source 722 is coupled to the second voltage Vb2.

In an embodiment, the first current I1 is larger than the second current I2, such that the charging operation is dominated by the first charging circuit 710A, but the disclosure is not limited thereto. In another embodiment, the first current I1 may be equal to the second current I2. The power consumption of the optical sensing panel 200p may be reduced because power consumption regarding to the first current source 712 belongs to power consumption of the readout integrated circuit 700A, not to the optical sensing panel 200p. The control circuit 630 is coupled to the first charging circuit 710A. The control circuit 630 outputs at least one control signal to control an operating period of the first charging circuit 710A. For example, the control circuit 630 may output the first control signal $V_{HD}$ and the second control signal $V_{HDB}$ to control the operating period of the first charging circuit 710A. The operating period of the first charging circuit 710A indicates a period that the first charging circuit 710A charges the output terminal 702 of the optical sensing panel 200p.

In an embodiment, the control circuit 630 may include a controller implemented by one or more processing elements, such as an array of logic gates, an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

As shown in FIG. 13, a pre-discharging circuit 1300 is coupled to the output terminal 702 of the optical sensing panel 200p. The pre-discharging circuit 1300 is configured to discharge the output terminal 702 to an initial voltage during a pre-discharging period. The pre-discharging period is earlier than the readout period. The pre-discharging circuit 1300 includes a third switch element 1310. The third switch element 1310 is controlled by a third control signal Vctrl_pred. The third switch element 1310 includes a first terminal, a second terminal and a control terminal. The first terminal of the third switch element 1310 is coupled to the output terminal 702 of the optical sensing panel 200p. The second terminal of the third switch element 1310 is coupled to a pre-discharging voltage Vpred. The control terminal of the third switch element 1310 is coupled to the third control signal Vctrl_pred. When the third switch element 1310 is conducted by the third control signal Vctrl_pred, the output terminal 702 is discharged to the initial voltage during the pre-discharging period. The third control signal Vctrl_pred may be outputted from the control circuit 630 or other external control circuits.

In the embodiment of FIG. 13, the second charging circuit 720 and the pre-discharging circuit 1300 are disposed in the readout integrated circuit 700A. For example, the readout integrated circuit 700A, the second charging circuit 720 and the pre-discharging circuit 1300 may be implemented in a single semiconductor chip or circuitry, but the disclosure is not limited thereto. In another embodiment, the second charging circuit 720, the pre-discharging circuit 1300, and the readout integrated circuit 700A can be implemented in separate devices. For example, the second charging circuit 720 and the pre-discharging circuit 1300 may be disposed in a display panel where the optical sensing panel 200p is embedded.

Figure 14:
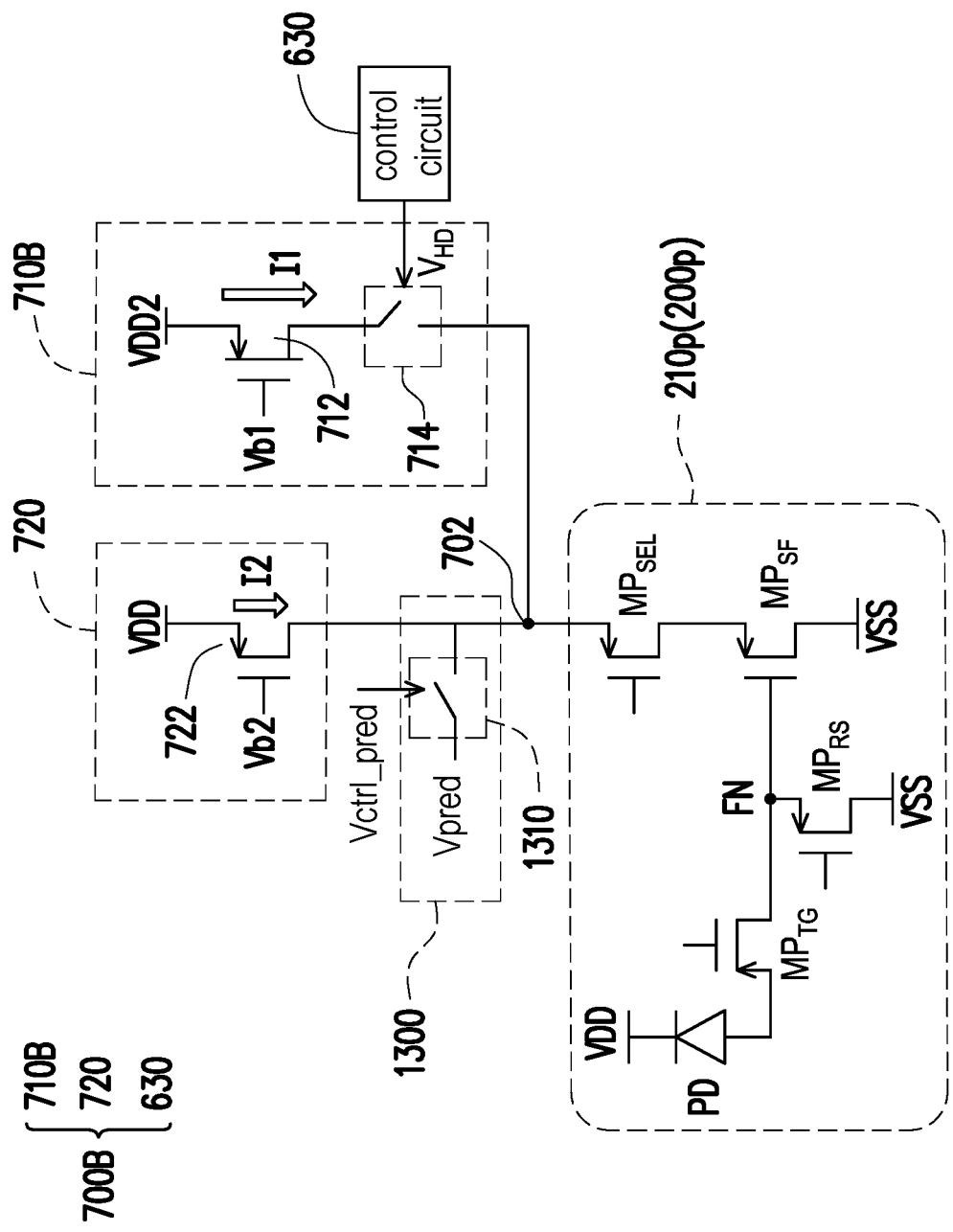
FIG. 14 is a schematic diagram illustrating a sensor circuit with P-type transistors and a readout integrated circuit according to another embodiment of the disclosure.

FIG. 14 is a schematic diagram illustrating a sensor circuit with P-type transistors and a readout integrated circuit according to another embodiment of the disclosure. Referring to FIG. 13 and FIG. 14, the readout integrated circuit 700B of FIG. 14 is similar to the readout integrated circuit 700A of FIG. 13, and the main difference therebetween, for example, lies in the circuit structure of the first charging circuit 710B.

To be specific, the first charging circuit 710B includes the first current source 712 and the first switch element 714. The first switch element 714 is controlled by the first control signal $V_{HD}$. The first switch element 714 include a first terminal, a second terminal and a control terminal. The first terminal of the first switch element 714 is coupled to the output terminal 702 of the optical sensing panel 200p. The second terminal of the first switch element 714 is coupled to the first terminal of the first current source 712. The control terminal of the first switch element 714 is coupled to the first control signal $V_{HD}$ generated by the control circuit 630. The control circuit 630 can directly turn on or turn off a charging path of the output voltage Vout by controlling a conduction state of the first switch element 714.

The operation of the readout integrated circuit 700B, the second charging circuit 720 and the pre-discharging circuit 1300 described in the embodiment of FIG. 14 is sufficiently taught, suggested, and embodied in the embodiments illustrated in FIG. 13, and therefore no further description is provided herein.

Figure 15:
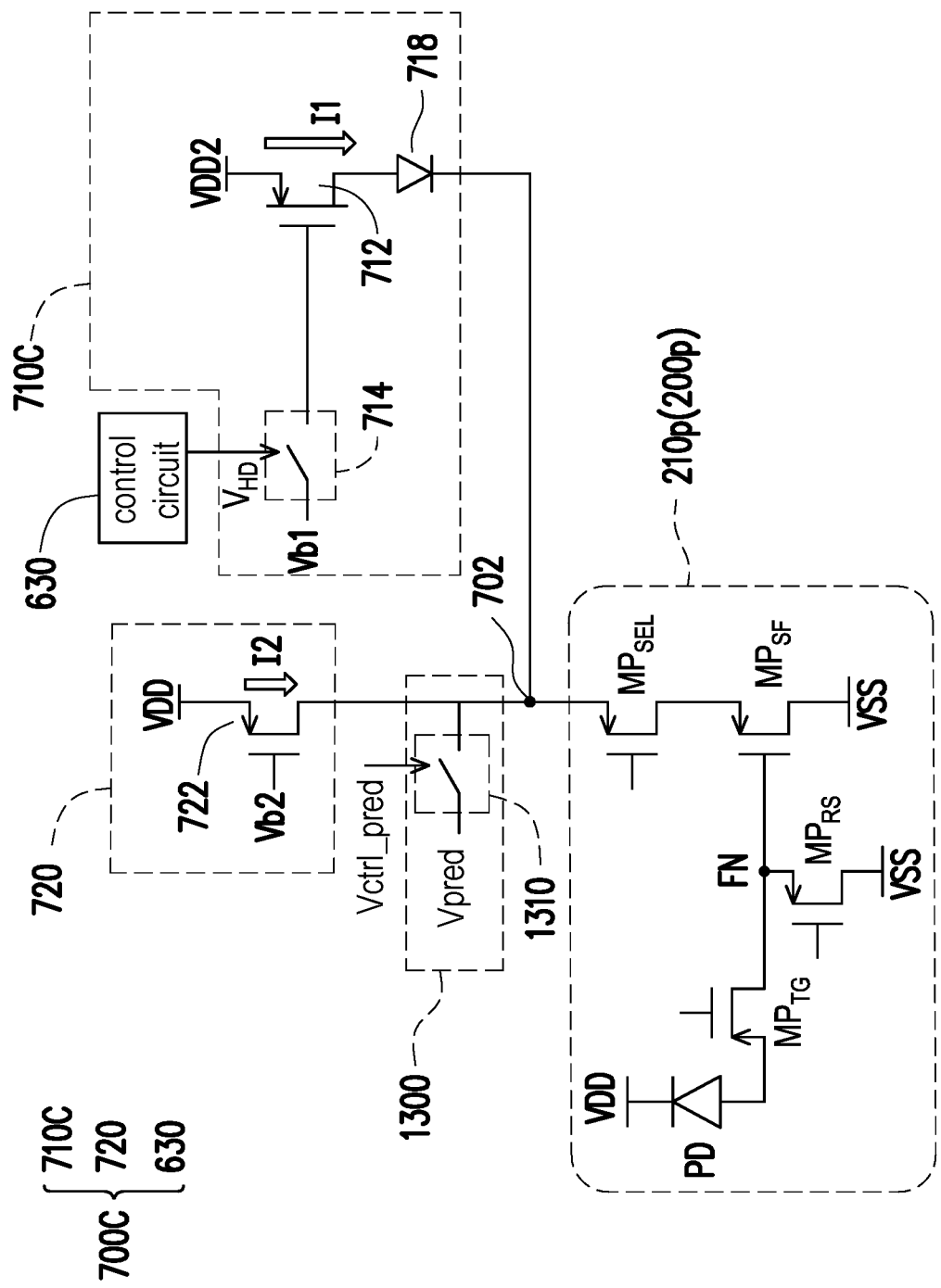
FIG. 15 is a schematic diagram illustrating a sensor circuit with P-type transistors and a readout integrated circuit according to another embodiment of the disclosure.

FIG. 15 is a schematic diagram illustrating a sensor circuit with P-type transistors and a readout integrated circuit according to another embodiment of the disclosure. Referring to FIG. 13 and FIG. 15, the readout integrated circuit 700C of FIG. 15 is similar to the readout integrated circuit 700A of FIG. 13, and the main difference therebetween, for example, lies in the circuit structure of the first charging circuit 710C.

To be specific, the first charging circuit 710C includes the first current source 712, the first switch element 714, and a diode element 718. The first switch element 714 is controlled by the first control signal $V_{HD}$ generated by the control circuit 630. The first switch element 714 includes a first terminal, a second terminal and a control terminal. The first terminal of the first switch element 714 is coupled to the first voltage Vb1. The second terminal of the first switch element 714 is coupled to the control terminal of the first current source 712. The control terminal of the first switch element 714 is coupled to the first control signal $V_{HD}$. The diode element 718 includes an anode terminal and a cathode terminal. The cathode terminal of the diode element 718 is coupled to the output terminal 702 of the optical sensing panel 200p, and the anode terminal of the diode element 718 is coupled to the first terminal of the first current source 712.

The diode element 718 can avoid that the output voltage Vout is pulled up to a specified voltage. For example, when the output voltage Vout is pulled up to the specified voltage, the diode element 718 is not conducted, such that the first current source 712 is turned off to stop the charging operation.

The operation of the readout integrated circuit 700C, the second charging circuit 720 and the pre-discharging circuit 1300 described in the embodiment of FIG. 15 is sufficiently taught, suggested, and embodied in the embodiments illustrated in FIG. 13, and therefore no further description is provided herein.

In summary, in the embodiments of the disclosure, a charging/discharging circuit is further added to the readout integrated circuit to charge or discharge the output terminals of the sensor array by a current during a readout period. Therefore, a charging/discharging speed of the fingerprint sensing signals can become faster, and the settling time of the fingerprint sensing signals is short to improve the quality of the fingerprint image.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A readout integrated circuit, configured to read out sensing signals from an optical sensing panel comprising a sensor array for fingerprint sensing, the readout integrated circuit comprising:
   a plurality of input terminals, configured to be coupled to a plurality of output terminals of the optical sensing panel;
   a first discharging circuit, coupled to one of the plurality of input terminals and configured to discharge an output terminal included in the plurality of output terminals of the optical sensing panel by a first current during a readout period, wherein the readout integrated circuit reads out a voltage of the output terminal of the optical sensing panel as a sensing signal; and
   a pre-charging circuit, coupled to the output terminal of the optical sensing panel, wherein the pre-charging circuit is configured to charge the output terminal of the optical sensing panel to an initial voltage during a pre-charging period, and the initial voltage is lower than and approximate to a highest input voltage of an analog-to-digital converter, wherein the pre-charging period is earlier than the readout period,
   wherein the first discharging circuit comprises:
   a first switch element, controlled to be either conducted or not by a control signal, wherein a first terminal of the first switch element is coupled to the output terminal of the optical sensing panel, and a control terminal of the first switch element is coupled to the control signal; and
   a first current source, coupled to a second terminal of the first switch element, wherein the first current source is configured to generate the first current.

2. The readout integrated circuit of claim 1, wherein the first current source is controlled by a first voltage to generate the first current, and the first current source comprises a first terminal, a second terminal and a control terminal, and the first current is transmitted from the first terminal of the first current source to the second terminal of the first current source,
   wherein the first terminal of the first current source is coupled to the second terminal of the first switch element, the second terminal of the first current source is coupled to a reference voltage, and the control terminal of the first current source is coupled to the first voltage.

3. The readout integrated circuit of claim 1, further comprising:
   a control circuit, coupled to the first discharging circuit and configured to output the control signal to control an operating period which is a time length that the first discharging circuit discharges the output terminal of the optical sensing panel by the first current.

4. The readout integrated circuit of claim 1, further comprising:
   a second discharging circuit, coupled to the output terminal of the optical sensing panel and configured to discharge the output terminal of the optical sensing panel by a second current during the readout period.

5. The readout integrated circuit of claim 4, wherein the second discharging circuit comprises:
   a second current source, controlled by a second voltage to generate the second current.

6. The readout integrated circuit of claim 5, wherein the second current source comprises a first terminal, a second terminal and a control terminal, and the second current is transmitted from the first terminal of the second current source to the second terminal of the second current source, wherein the first terminal of the second current source is coupled to the output terminal of the optical sensing panel, the second terminal of the second current source is coupled to a reference voltage, and the control terminal of the second current source is coupled to the second voltage.

7. The readout integrated circuit of claim 1, wherein the pre-charging circuit comprises:
   a third switch element, controlled by a third control signal and comprising a first terminal, a second terminal and a control terminal, wherein the first terminal of the third switch element is coupled to the output terminal of the optical sensing panel, the second terminal of the third switch element is coupled to a pre-charging voltage, and the control terminal of the third switch element is coupled to the third control signal.

8. The readout integrated circuit of claim 1, wherein the second discharging circuit and the pre-charging circuit are disposed in the readout integrated circuit.

9. The readout integrated circuit of claim 1, wherein the second discharging circuit and the pre-charging circuit are disposed in a display panel where the sensor array is embedded.

10. The readout integrated circuit of claim 4, wherein the first current is larger than or equal to the second current.

11. A readout integrated circuit, configured to read out sensing signals from an optical sensing panel comprising a sensor array for fingerprint sensing, the readout integrated circuit comprising:
    a plurality of input terminals, configured to be coupled to a plurality of output terminals of the optical sensing panel;
    a first charging circuit, coupled to one of the plurality of input terminals and configured to charge an output terminal included in the plurality of output terminals of the optical sensing panel by a first current during a readout period, wherein the readout integrated circuit reads out a voltage of the output terminal of the optical sensing panel as a sensing signal; and
    a pre-discharging circuit, coupled to the output terminal of the optical sensing panel, wherein the pre-discharging circuit is configured to discharge the output terminal of the optical sensing panel to an initial voltage during a pre-discharging period, and the initial voltage is higher than and approximate to a lowest input voltage of an analog-to-digital converter, wherein the pre-discharging period is earlier than the readout period,
    wherein the first charging circuit comprises:
    a first switch element, controlled to be either conducted or not by a control signal, wherein a first terminal of the first switch element is coupled to the output terminal of the optical sensing panel, and a control terminal of the first switch element is coupled to the control signal; and a first current source, coupled to a second terminal of the first switch element, wherein the first current source is configured to generate the first current.

12. The readout integrated circuit of claim 11, wherein the first current source is controlled by a first voltage to generate the first current, and the first current source comprises a first terminal, a second terminal and a control terminal, and the first current is transmitted from the second terminal of the first current source to the first terminal of the first current source, wherein the first terminal of the first current source is coupled to the second terminal of the first switch element, the second terminal of the first current source is coupled to a reference voltage, and the control terminal of the first current source is coupled to the first voltage.

13. The readout integrated circuit of claim 11, further comprising:

a control circuit, coupled to the first charging circuit and configured to output the control signal to control an operating period which is a time length that the first charging circuit charges the output terminal of the optical sensing panel by the first current.

14. The readout integrated circuit of claim 11, further comprising:

a second charging circuit, coupled to the output terminal of the optical sensing panel and configured to charge the output terminal of the optical sensing panel by a second current during the readout period.

15. The readout integrated circuit of claim 14, wherein the second charging circuit comprises:

a second current source, controlled by a second voltage to generate the second current.

16. The readout integrated circuit of claim 15, wherein the second current source comprises a first terminal, a second terminal and a control terminal, and the second current is transmitted from the first terminal of the second current source to the second terminal of the second current source, wherein the second terminal of the second current source is coupled to the output terminal of the optical sensing panel, the first terminal of the second current source is coupled to a reference voltage, and the control terminal of the second current source is coupled to the second voltage.

17. The readout integrated circuit of claim 11, wherein the pre-discharging circuit comprises:

a third switch element, controlled by a third control signal and comprising a first terminal, a second terminal and a control terminal, wherein the first terminal of the third switch element is coupled to the output terminal of the optical sensing panel, the second terminal of the third switch element is coupled to a pre-discharging voltage, and the control terminal of the third switch element is coupled to the third control signal.

18. The readout integrated circuit of claim 11, wherein the second charging circuit and the pre-discharging circuit are disposed in the readout integrated circuit.

19. The readout integrated circuit of claim 11, wherein the second charging circuit and the pre-discharging circuit are disposed in a display panel where the sensor array is embedded.

20. The readout integrated circuit of claim 14, wherein the first current is larger than or equal to the second current.

21. A readout integrated circuit, configured to read out sensing signals from an optical sensing panel comprising a sensor array for fingerprint sensing, the readout integrated circuit comprising:

a plurality of input terminals, configured to be coupled to a plurality of output terminals of the optical sensing panel; and a first charging/discharging circuit, coupled to one of the plurality of input terminals and configured to charge or discharge an output terminal included in the plurality of output terminals of the optical sensing panel by a first current during a readout period, wherein the readout integrated circuit reads out a voltage of the output terminal of the optical sensing panel as a sensing signal, wherein the first charging/discharging circuit comprises:

a first switch element, controlled by a first control signal; and a second switch element, controlled by a second control signal, wherein a phase of the second control signal and a phase of the first control signal are inverted with each other.

22. The readout integrated circuit of claim 21, further comprising:

a control circuit, coupled to the first charging/discharging circuit and configured to output the first control signal and the second control signal to control an operating period which is a time length that the first charging/discharging circuit charges or discharges the output terminal of the optical sensing panel by the first current.

23. The readout integrated circuit of claim 21, wherein a first terminal of the first switch element is coupled to a first voltage, a second terminal of the first switch element is coupled to a control terminal of the first current source, and a control terminal of the first switch element is coupled to the first control signal; and wherein a first terminal of the second switch element is coupled to the control terminal of the first current source, a second terminal of the second switch element is coupled to a reference voltage, and a control terminal of the second switch element is coupled to the second control signal.

24. The readout integrated circuit of claim 21, wherein when the first switch element is conducted, the second switch element is not conducted; and when the second switch element is conducted, the first switch element is not conducted.

25. The readout integrated circuit of claim 21, wherein the first charging/discharging circuit is configured to discharge the output terminal of the optical sensing panel when the readout integrated circuit is adapted for the optical sensing panel comprising sensor circuits with N-type transistors, and the first charging/discharging circuit is configured to charge the output terminal of the optical sensing panel when the readout integrated circuit is adapted for the optical sensing panel comprising sensor circuits with P-type transistors.

26. A readout integrated circuit, configured to read out sensing signals from an optical sensing panel comprising a sensor array for fingerprint sensing, the readout integrated circuit comprising:

a plurality of input terminals, configured to be coupled to a plurality of output terminals of the optical sensing panel; and a first charging/discharging circuit, coupled to one of the plurality of input terminals and configured to charge or discharge an output terminal included in the plurality of output terminals of the optical sensing panel by a first current during a readout period, wherein the readout integrated circuit reads out a voltage of the output terminal of the optical sensing panel as a sensing signal, wherein the first charging/discharging circuit comprises:
a first current source;
a first switch element, controlled by a control signal, wherein a first terminal of the first switch element is coupled to a first voltage, a second terminal of the first switch element is coupled to a control terminal of the first current source, and a control terminal of the first switch element is coupled to the control signal; and
a diode element, comprising an anode terminal and a cathode terminal, wherein one terminal of the anode terminal and the cathode terminal is coupled to the output terminal of the optical sensing panel, and the other terminal of the anode terminal and the cathode terminal is coupled to a first terminal of the first current source.

27. The readout integrated circuit of claim 26, further comprising:
a control circuit, coupled to the first charging/discharging circuit and configured to output the control signal to control an operating period which is a time length that the first charging/discharging circuit charges or discharges the output terminal of the optical sensing panel by the first current.

28. The readout integrated circuit of claim 26, wherein the first charging/discharging circuit is configured to discharge the output terminal of the optical sensing panel when the readout integrated circuit is adapted for the optical sensing panel comprising sensor circuits with N-type transistors, and the first charging/discharging circuit is configured to charge the output terminal of the optical sensing panel when the readout integrated circuit is adapted for the optical sensing panel comprising sensor circuits with P-type transistors.

* * * * *